United States Patent
Kobayashi et al.

(10) Patent No.: US 12,091,077 B2
(45) Date of Patent: Sep. 17, 2024

(54) VEHICLE

(71) Applicant: Honda Motor Co., Ltd., Tokyo (JP)

(72) Inventors: Kei Kobayashi, Wako (JP); Takashi Hirota, Wako (JP); Tomoya Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/223,510

(22) Filed: Jul. 18, 2023

(65) Prior Publication Data

US 2024/0025468 A1 Jan. 25, 2024

(30) Foreign Application Priority Data

Jul. 22, 2022 (JP) ................ 2022-117182

(51) Int. Cl.
*B62D 1/181* (2006.01)
*B60K 37/00* (2024.01)
*B62D 1/185* (2006.01)

(52) U.S. Cl.
CPC .......... *B62D 1/181* (2013.01); *B60K 37/00* (2013.01); *B62D 1/185* (2013.01)

(58) Field of Classification Search
CPC .......... B62D 1/181; B62D 1/185; B62D 1/18; B62D 1/183; B62D 1/197; B60K 37/00; B60K 35/00; B60R 21/09
See application file for complete search history.

(56) References Cited

U.S. PATENT DOCUMENTS

2022/0274639 A1 * 9/2022 Park ............... B62D 1/183

FOREIGN PATENT DOCUMENTS

| CN | 104691604 A * | 6/2015 | |
|---|---|---|---|
| DE | 102016011461 A1 * | 4/2017 | ............ B60K 35/00 |
| DE | 102020200409 A1 * | 7/2021 | |
| DE | 102020121763 A1 * | 2/2022 | |
| DE | 102021125546 A1 * | 9/2022 | ............ B62D 1/181 |
| FR | 3062839 B1 * | 6/2020 | ............ B62D 1/18 |
| JP | 2004182141 A | 7/2004 | |
| WO | WO-2020015939 A1 * | 1/2020 | ............ B60K 35/00 |

* cited by examiner

Primary Examiner — Drew J Brown
(74) Attorney, Agent, or Firm — Duft & Bornsen, PC

(57) ABSTRACT

A vehicle an instrument panel, a first actuator moving the instrument panel in a front-rear direction, a steering part provided in the instrument panel movable in the front-rear direction, a second actuator moving the steering part relatively with respect to the instrument panel, a microprocessor controlling the first actuator and the second actuator, and a memory previously storing a target instrument panel position and a target steering position in association with a driver. The microprocessor is configured to perform the controlling including determining whether the driver has started a driving operation, and when it is determined that the driver has started the driving operation, controlling the first actuator and the second actuator so that the instrument panel and the steering part are respectively located in the target instrument panel position and the target steering position stored in the memory.

20 Claims, 10 Drawing Sheets

VEHICLE

CROSS-REFERENCE TO RELATED APPLICATION

This application is based upon and claims the benefit of priority from Japanese Patent Application No. 2022-117182 filed on Jul. 22, 2022, the content of which is incorporated herein by reference.

BACKGROUND OF THE INVENTION

Field of the Invention

This invention relates to a vehicle having a movable instrument panel.

Description of the Related Art

Conventionally, there has been a known apparatus in which an instrument panel disposed in front of a vehicle seat is provided so as to be movable in the front-rear direction. Such an apparatus is described, for example, in Japanese Unexamined Patent Publication (JP2004-182141A). In the apparatus described in JP2004-182141A, when the steering device is not used, the instrument panel is in a housed state in which the instrument panel is moved forward, and when the steering device is used, the instrument panel is in a track mode position or a sporting mode position in which the instrument panel is moved backward.

However, in the apparatus described in JP2004-182141A, since the position of the instrument panel is uniformly set regardless of the physique of the driver or the like, the driver may not be sufficiently satisfied with respect to the position of the instrument panel.

SUMMARY OF THE INVENTION

An aspect of the present invention is a vehicle including an instrument panel disposed on a front side of a vehicle seat in a manner movable in a front-rear direction, a first actuator configured to move the instrument panel in the front-rear direction, a steering part provided in the instrument panel in a manner movable relatively in the front-rear direction with respect to the instrument panel, a second actuator configured to move the steering part relatively with respect to the instrument panel, a microprocessor configured to perform controlling the first actuator and the second actuator, and a memory configured to previously store a target instrument panel position and a target steering position in association with a driver. The microprocessor is configured to perform the controlling including determining whether the driver has started a driving operation, and when it is determined that the driver has started the driving operation, controlling the first actuator and the second actuator so that the instrument panel and the steering part are respectively located in the target instrument panel position and the target steering position stored in the memory.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

First Embodiment

Hereinafter, a first embodiment of the present invention is explained with reference to FIGS. 1A to 5. A vehicle 100 according to the first embodiment of the present invention includes an instrument panel that is disposed to face a driver seated on a vehicle seat and is movable in the front-rear direction. The vehicle 100 includes an internal combustion engine, a travel motor, or both the internal combustion engine and the travel motor as a travel drive source. That is, the vehicle 100 is an engine vehicle, an electric vehicle, or a hybrid vehicle.

Figure 1A:
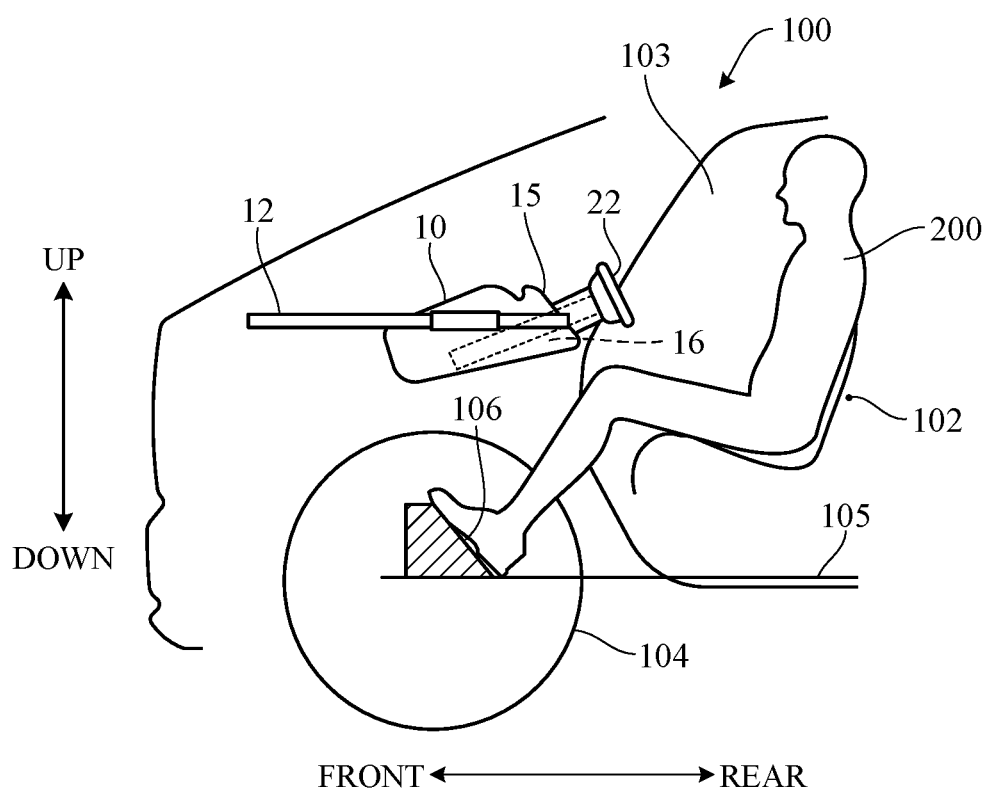
FIG. 1A is a side view illustrating a configuration of main components of a vehicle according to a first embodiment of the present invention, in which an instrument panel is located in a normal position.
Figure 1B:
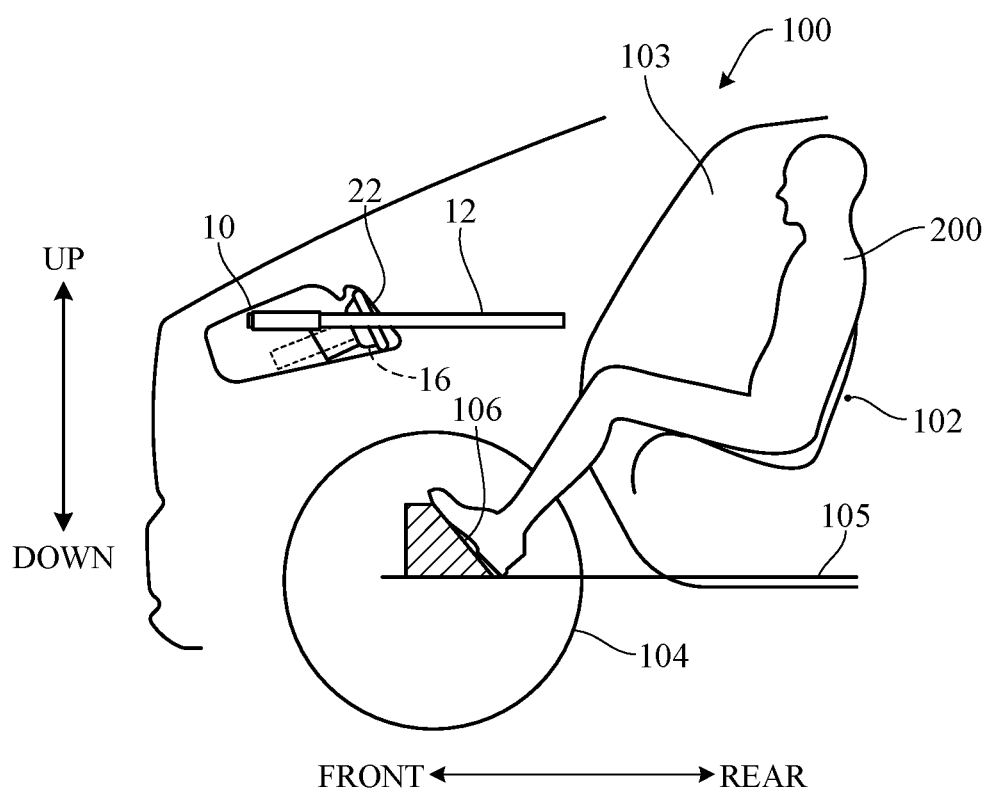
FIG. 1B is a side view illustrating a configuration of main components of the vehicle according to the first embodiment of the present invention, in which the instrument panel is located in a retracted position.
Figure 2A:
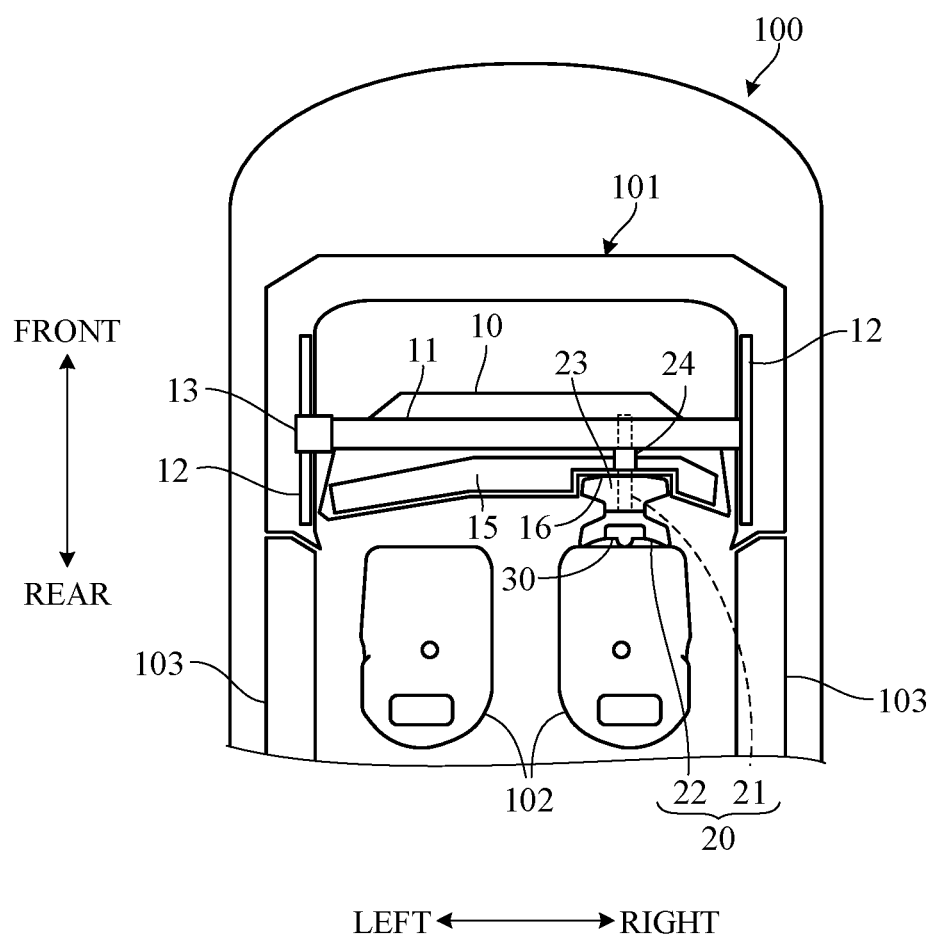
FIG. 2A is a plan view illustrating a configuration of main components of the vehicle according to the first embodiment of the present invention, in which the instrument panel is located in the normal position.
Figure 2B:
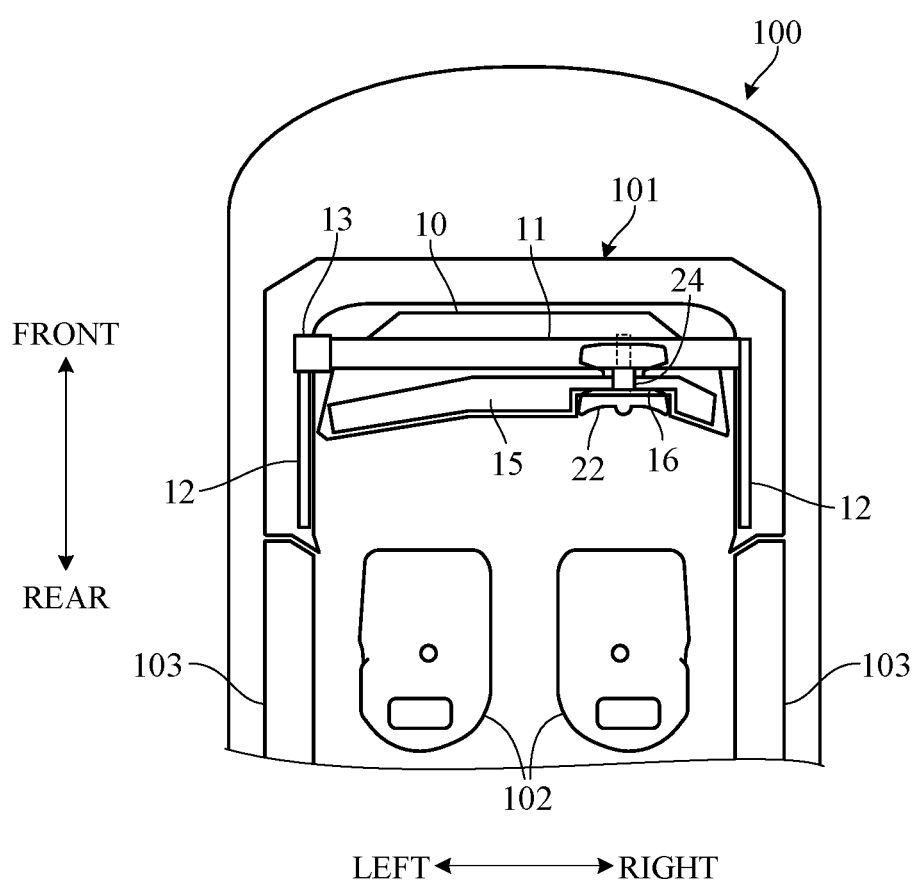
FIG. 2B is a plan view illustrating a configuration of main components of the vehicle according to the first embodiment of the present invention, in which the instrument panel is located in the retracted position.

FIGS. 1A and 1B are each a side view illustrating a configuration of main components of the vehicle 100 according to the first embodiment of the present invention, and FIGS. 2A and 2B are each a plan view. FIGS. 1A and 2A each illustrate a normal position of an instrument panel when a driver performs a driving operation of the vehicle 100, and FIGS. 1B and 2B each illustrate a retracted position of the instrument panel when the driver 200 does not perform the driving operation of the vehicle 100. Hereinafter, for the sake of convenience, a front-rear direction, a left-right direction, and an up-down direction are defined as illustrated in the drawings, and the configuration of each part will be described in accordance with such definitions.

As illustrated in FIGS. 1A and 2A, the vehicle 100 includes an instrument panel 10, which is disposed on a front side of a front seat 102. The instrument panel 10 is supported by a vehicle body frame 101, which forms a skeleton of the vehicle 100. More specifically, the instrument panel 10 includes a movable frame 11 extending in the left-right direction, and both left and right end portions of the movable frame 11 are slidably engaged with rails 12 extending in the front-rear direction on left and right side walls of the vehicle body frame 101. The instrument panel 10 moves in the front-rear direction along the rails 12 via a drive mechanism including an actuator 13 such as a motor. The drive mechanism is, for example, a rack and pinion type drive mechanism including a pinion gear rotationally driven by the actuator 13, and a rack gear extending along the rails 12 and meshing with the pinion gear.

A door 103, which is openable and closable, is provided on a rear side of the rails 12. When a driver 200 gets in and out of the vehicle 100 through the door 103, as illustrated in FIGS. 1B and 2B, the position of the instrument panel 10 (an instrument panel position) is a retracted position where the instrument panel 10 has moved forward to the maximum. This enables the driver 200 to easily get in and out of the vehicle 100. When the driver 200 gets in the vehicle 100, as illustrated in FIGS. 1A and 2A, the instrument panel 10 moves rearward, and the instrument panel position becomes the normal position.

A display part 15 is provided on a rear surface of the instrument panel 10. The display part 15 displays vehicle information such as a vehicle speed and a remaining amount of fuel, map information indicating a current location of the vehicle 100 and a route from the current location to a destination, setting information of air conditioning, audio, and the like of the vehicle 100, and the like. The display part 15 includes, for example, a touch panel. In a case where the instrument panel position is the normal position, the driver 200 is able to input information of the destination, various types of setting information, and the like via the touch panel (the display part 15).

A steering part 20 (FIG. 2A) is movably supported by the instrument panel 10. The steering part 20 includes a steering shaft 21, which extends in the front-rear direction, and a front end portion of which is rotatably supported by the instrument panel 10, and a steering wheel 22, which is fixed to a rear end portion of the steering shaft 21. A rotation operation (rotation amount) of the steering wheel 22 is detected by a rotation sensor 23. A signal from the rotation sensor 23 is input into a travel controller for controlling a travelling action of the vehicle 100. That is, a turning command corresponding to an operation amount on the steering wheel 22 is input by wire. The travel controller drives a steering mechanism (not illustrated), based on the signal from the rotation sensor 23. Accordingly, front wheels 104 are steered in the left-right direction in accordance with the operation on the steering wheel 22.

The steering wheel 22 is provided to be movable in the front-rear direction with respect to the instrument panel 10 along the steering shaft 21 or integrally with the steering shaft 21 in accordance with actuation of an actuator 24 such as a motor. Accordingly, in a case where the instrument panel position is the normal position, the position of the steering wheel 22 (the steering wheel position) can be adjusted to the optimum position for the driver 200, so that the driving operation of the driver 200 becomes easy. The position of the steering wheel 22 with respect to the instrument panel 10 as illustrated in FIGS. 1A and 2A, that is, a position where the steering wheel 22 protrudes rearward from a rear surface of the instrument panel will be referred to as a protrusion position.

The steering wheel 22 is provided with a steering operation unit into which a predetermined command to the vehicle 100 is input. The steering operation unit includes a switch and a lever, so that a command related to a driving support function such as following travel and lane-keeping travel, a command related to an audio device, and the like. It is also possible to input a shift command for a transmission gear from the steering operation unit.

An illustration is omitted, but an accelerator input unit (an accelerator operation unit) that instructs acceleration or deceleration of the vehicle 100 and a brake input unit (a brake operation unit) that instructs braking of the vehicle 100 are provided in the vicinity of the steering wheel 22. The accelerator input unit and the brake input unit each can be configured with, for example, a lever member movable in the front-rear direction. An operation amount of the lever member is detected by a sensor such as a potentiometer, and a signal from the sensor is input into the travel controller. Accordingly, an acceleration or deceleration command and a braking command in accordance with the operation amount of the lever member are input by wire. The provision of the accelerator input unit and the brake input unit in the vicinity of the steering wheel 22 omits the accelerator pedal and the brake pedal.

An airbag module 30 as an airbag unit is incorporated in a central portion of the steering wheel 22. The airbag module 30 includes an inflator, and when a predetermined impact acts on the vehicle 100, a control signal is output from a controller for airbag control to the inflator, and the inflator inflates and deploys the airbag. An impact acting on the vehicle 100 is detected by an acceleration sensor, which is not illustrated.

The instrument panel 10 is provided with a depressed portion 16, which faces the front surface of the steering wheel 22. As illustrated in FIGS. 1B and 2B, in a case where the instrument panel position is the retracted position, the steering wheel 22 moves forward in accordance with the actuation of the actuator 24, and is accommodated in the depressed portion 16. For example, the steering wheel 22 is accommodated in the depressed portion 16 via a link mechanism (not illustrated). The steering wheel position with respect to the instrument panel 10 as illustrated in FIGS. 1B and 2B will be referred to as a housed position. In a case where the steering wheel position is the housed position, the rear surface of the steering wheel 22 is located to be substantially flush with the rear surface of the instrument panel 10. Therefore, the steering wheel 22 does not protrude rearward from the surface of the instrument panel 10, and it is easy for the driver 200 to get in and out of the vehicle 100. An actuator for housing the steering wheel may be provided separately from the actuator 24 for adjusting the position of the steering wheel 22.

In this manner, in the vehicle in the present embodiment, the position of the instrument panel 10 and the position of the steering wheel 22 each can be changed with respect to the seat 102. Thus, it becomes possible to change the distances from the driver 200 to the instrument panel 10 and to the steering wheel 22, without changing the position of the seat 102. Therefore, there is no need for any position adjustment mechanism for adjusting the seat position, and the seat 102 is provided so as not to be movable in the front-rear direction. As illustrated in FIGS. 1A and 1B, a footrest portion 106 is provided on a floor 105 in the interior of the vehicle 100 to correspond to the position of the seat 102. The footrest portion 106 is inclined in a downward gradient toward a rear side so that a foot sole of the driver 200 is placed. This enables stabilization of a riding posture of the driver 200. The footrest portion 106 may be provided to be movable in the front-rear direction along the floor 105.

Figure 3:
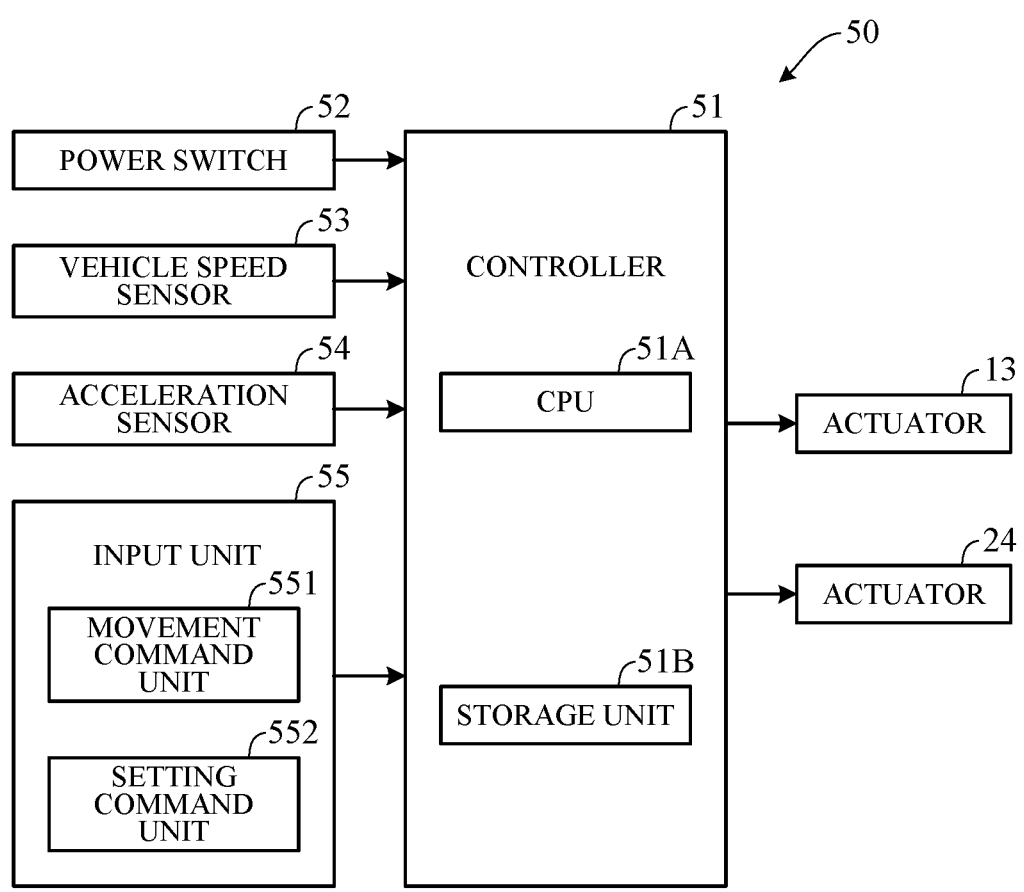
FIG. 3 is a block diagram illustrating a configuration of main components of a control device mounted on the vehicle according to the first embodiment of the present invention.

The vehicle 100 includes a control device that controls the instrument panel position and the steering wheel position. FIG. 3 is a block diagram illustrating a configuration of main components of a control device 50 to be mounted on the vehicle 100 according to the first embodiment of the present invention. As illustrated in FIG. 3, the control device 50 includes a controller 51 as a control unit as the center, and includes a power switch 52, a vehicle speed sensor 53, an acceleration sensor 54, an input unit 55, and actuators 13 and 24, which are respectively connected with the controller 51.

The power switch 52 is a switch to be operated to turn on, when the driver starts a driving operation, for example, an ignition switch. The vehicle speed sensor 53 detects the vehicle speed of the vehicle 100. The acceleration sensor 54 detects acceleration of the vehicle 100, in particular, an impact acting on the vehicle 100, such as an impact that activates an airbag unit. The controller 51 includes a CPU 51A (a microprocessor) and a storage unit 51B (a memory) such as a ROM or a RAM.

The input unit 55 includes a movement command unit 551 and a setting command unit 552. The movement command unit 551 includes an operation member to be operated by the driver, so that the actuators 13 and 24 are actuated in accordance with an operation on the operation member. That is, when the driver 200 gets in the vehicle 100 for the first time, no setting has been made for the instrument panel position (referred to as a target instrument panel position) or the steering wheel position (referred to as a target steering wheel position) corresponding to the driver 200 as illustrated in FIGS. 1A and 2A. Therefore, it is necessary to set these target positions. In this situation, the actuators 13 and 24 are actuated by an input signal from the movement command unit 551, that is, a manual command of the driver 200, and the instrument panel position and the steering wheel position are respectively adjusted to be located in target positions depending on preferences of the driver 200.

The setting command unit 552 includes an operation member to be operated by the driver. Such an operation member is operated, when the instrument panel position and the steering wheel position are respectively adjusted to the target positions via the movement command unit 551, and thus the target positions are stored in the storage unit 51B. Once the target positions are stored in the storage unit 51B, whenever the driver 200 turns on the power switch 52 after that, the target positions are read from the storage unit 51B, and the actuators 13 and 24 are actuated in accordance with the target positions. Accordingly, the instrument panel 10 and the steering wheel 22 respectively move to the target positions.

In a case where a plurality of drivers 200 drive the identical vehicle 100, the target positions (the target instrument panel position and the target steering wheel position) are stored in the storage unit 51B for every driver. For example, a plurality of setting command units 552 are respectively provided to correspond to the drivers, so that the target positions can be stored for every driver. In this case, after turning on the power switch 52, the driver 200 operates the setting command unit 552 corresponding to the driver 200 among the plurality of setting command units 552, and then is able to read the target positions corresponding to the driver 200 from the storage unit 51B.

The configuration of the input unit 55 is not limited to the above-described one. The input unit 55 may be configured such that an identification ID of the driver 200 can be input, and in addition, a plurality of target positions may be stored in the storage unit 51B in association with the identification ID of the driver 200. Then, after getting in the vehicle, the driver 200 inputs the identification ID via the input unit 55, and then the controller 51 may read the target positions from the storage unit 51B. Accordingly, in a case where there are a plurality of drivers 200 who drive the identical vehicle 100, it becomes easy to set the target positions corresponding to each driver 200.

Assuming that the driver 200, carrying a mobile terminal, gets in the vehicle 100, the input unit 55 may automatically acquire the identification ID from the mobile terminal, so that the controller 51 may read the target positions corresponding to the identification ID from the storage unit 51B. In this case, the input unit 55 includes a communication unit capable of communicating with the mobile terminal. Information indicating physical constitutions (height, weight, and the like) of the driver may be stored beforehand in a memory of the mobile terminal. When the driver 200 gets in the vehicle, the controller 51 may read such information from the mobile terminal and automatically set the target positions corresponding to the physical constitutions of the driver 200.

The CPU 51A outputs a control signal to the actuators 13 and 24 in accordance with turning on or off the power switch 52. That is, when the power switch 52 is turned off, the CPU 51A outputs control signals to the actuators 13 and 24 so that the instrument panel is located in the retracted position and the steering wheel is located in the housed position, as illustrated in FIGS. 1B and 2B. This enlarges the space on a front side of the driver 200. After turning off the power switch 52, the driver 200 is able to easily get off through the door 103.

After getting in the vehicle 100, when the driver 200 turns on the power switch 52, the CPU 51A reads the target positions stored in the storage unit 51B, and outputs control signals respectively to the actuators 13 and 24 so that the instrument panel 10 and the steering wheel 22 are located in the target positions. Accordingly, as illustrated in FIGS. 1A and 1B, the instrument panel 10 moves rearward to the normal position (the target instrument panel position), and the steering wheel 22 protrudes rearward to the protrusion position (the target steering wheel position).

Figure 4:
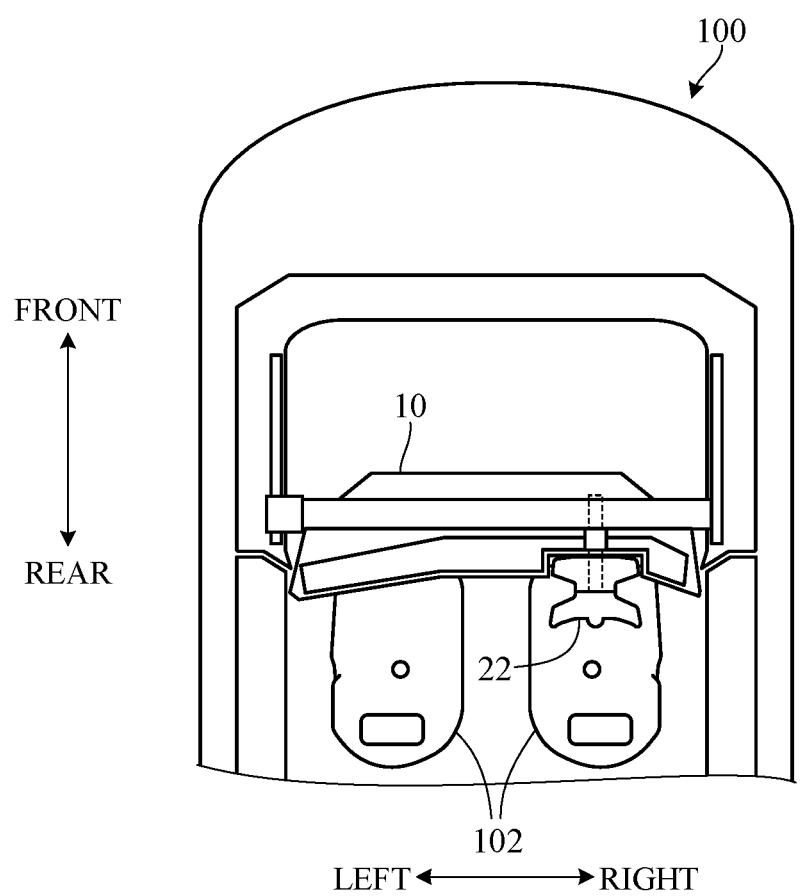
FIG. 4 is a plan view illustrating an example in the normal position different from FIG. 2A.

The target positions are each a target position for the driving operation of the driver 200, are defined for every user, and are stored in the storage unit 51B. Therefore, for example, in a case where the driver 200 is physically small, as illustrated in FIG. 4, after turning on the power switch 52, the instrument panel position (the normal position) is located on a rear side relative to that illustrated in FIG. 2A. In this manner, since the instrument panel 10 and the steering wheel 22 respectively move to the target positions corresponding to the physical constitutions of the driver 200, the driver 200 is able to grip the steering wheel 22 in an optimum state without adjusting the seat position.

After the instrument panel 10 and the steering wheel 22 respectively move to the target positions, when the vehicle speed sensor 53 detects a stop state of the vehicle 100 for a predetermined time or more, it is estimated that the driver 200 does not intend to perform the driving operation. In this situation, the CPU 51A respectively outputs control signals to the actuators 13 and 24 to move the instrument panel 10 forward and to move the steering wheel 22 to the retracted position, as illustrated in FIGS. 1B and 2B. Accordingly, even though the power switch 52 is not turned off, the instrument panel 10 can be automatically retracted forward. The surrounding situation of the vehicle 100 may be monitored by an in-vehicle camera so as to determine whether the vehicle is in a state of waiting for a traffic light or is in a traffic jam. Under a condition that the vehicle is not in the state of waiting for a traffic light or in a traffic jam, the instrument panel 10 may be allowed to move forward.

The storage unit 51B stores not only the target positions for the driving operation of the driver 200 but also target positions for airbag activation (target positions for an airbag) beforehand. Such target positions for the airbag may be identical to or different from the target positions for the driving operation. The target positions for the airbag may be set for every driver in consideration of the physical constitutions of the driver 200, or may be set with uniform values, instead of being set for every driver.

After the driver 200 gets in the vehicle 100, when the acceleration sensor 54 detects an impact of a predetermined value or more on the vehicle 100, the inflator inflates and deploys the airbag. At this timing, the CPU 51A outputs control signals to the actuators 13 and 24 to move the steering wheel 22, in which the airbag module 30 is accommodated, to the target position for the airbag. Accordingly, the airbag is deployed in the optimum position with respect to the driver 200, so that the driver 200 can be protected from the impact sufficiently.

Figure 5:
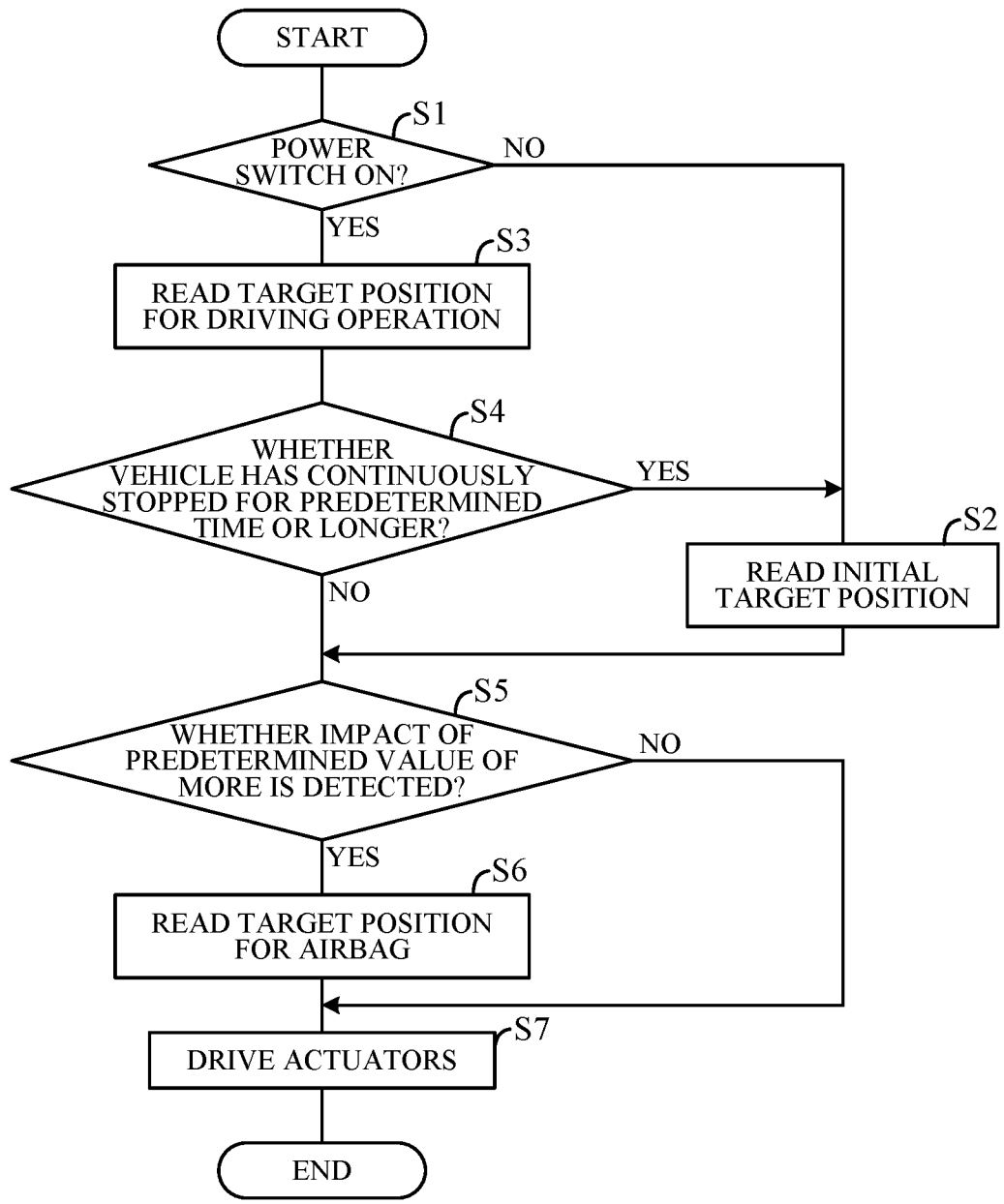
FIG. 5 is a flow chart illustrating an example of processing performed by a CPU of FIG. 3.

FIG. 5 is a flow chart illustrating an example of processing performed by the CPU 51A of FIG. 3 in accordance with a pre-stored program. The process shown in this flow chart is started with the target position for the driving operation and the target position for the airbag corresponding to the driver 200 stored in the storage unit 51B in advance, and is repeated at a predetermined interval.

In FIG. 5, first, the CPU 51A determines whether or not the power switch 42 is turned on in S1 (S: processing step). If a negative decision is made in S1, the processing proceeds to S2, in which the CPU 51A reads the target positions of the instrument panel and the steering wheel 22 stored in the storage unit 51B in advance, that is, the retracted position of the instrument panel 10 and the housed position of the steering wheel 22 shown in FIGS. 1B and 2B, and the processing proceeds to S5. In this case, the target position is referred to as an initial target position for convenience.

On the other hand, if an affirmative decision is made in S1, the processing proceeds to S3, in which the CPU 51A reads the target position for the driving operation stored in advance in the storage unit 51B, that is, the target instrument panel position (normal position) and the target steering wheel position (protrusion position) corresponding to the driver 200 as shown in FIG. 1A, FIG. 2A or FIG. 4. Next, in S4, the CPU 51A determines whether or not the vehicle 100 has continuously stopped for a predetermined time or longer based on a signal from the vehicle speed sensor 53. If an affirmative decision is made in S4, the processing proceeds to S2, while if a negative decision is made, the processing proceeds to S5.

In S5, the CPU 51A determines whether or not an impact of a predetermined value or more on the vehicle 100 is detected based on a signal from the acceleration sensor 54. If an affirmative decision is made in S5, the processing proceeds to S6, while if a negative decision is made, the processing proceeds to S7 without performing the processing in S6. In S6, the CPU 51A reads the target position for the airbag stored in the storage unit 51B in advance.

The target positions of the instrument panel 10 and the steering wheel 22 are set through the processing S1 to S6. That is, if an affirmative decision is made in S1, and then a negative decision is made in S5, the target position for the driving operation is set. If a negative decision is made in S1, and then a negative decision is made in S5, the initial target position is set. If an affirmative or negative decision is made in S1, and then an affirmative decision is made in S5, the target position for the airbag is set. In S7, the CPU 51A outputs the control signal to the actuators 13 and 24 so that the instrument panel position and the steering wheel position become one of the initial target position, the target position for the driving operation, and the target position for the airbag respectively set, and the processing ends.

The operation of the vehicle 100 according to the first embodiment is summarized as follows. Before the driver 200 gets into the vehicle 100, the power switch 52 is turned off. Accordingly, as shown in FIGS. 1B and 2B, the instrument panel position is in the retracted position and the steering wheel position is in the housed position (S2→S7). Therefore, the driver 200 can easily ride on the vehicle 100.

When the driver 200 rides on the vehicle 100 and the power switch 52 is turned on, the instrument panel 10 and the steering wheel 22 move to the target positions corresponding to the driver 200 as shown in FIG. 1A, FIG. 2A or FIG. 4 (S3→S7). As a result, the driver 200 can easily operate the instrument panel 10 and the steering wheel 22, and thus the driving operability is improved. The driver 200 can also easily operate the display part 15 (touch panel) on the instrument panel.

The driver 200 turns off the power switch 52 when getting off the vehicle 100. As a result, the instrument panel 10 and the steering wheel 22 are moved to the retracted position and the housed position, respectively (S2→S7). Therefore, the driver 200 can easily get off the vehicle 100. When the stop state has continued for a predetermined time or longer, it is assumed that the driver intends to stop the driving operation. In this case, even if the power switch 52 is not turned off, the instrument panel 10 and the steering wheel 22 are moved to the retracted position and the housed position as in the case where the power switch 52 is turned off (S4→S2).

When it is detected that an impact of a predetermined value or more is applied to the vehicle 100, a control signal is output to the inflator, and the airbag is inflated and deployed. At this time, the instrument panel 10 and the steering wheel 22 are moved to the target positions for the airbags corresponding to the driver 200 (S6→S7). As a result, the airbag is inflated and deployed at an optimum position with respect to the driver 200, so that the driver 200 can be protected well. In a state where the target position for the driving operation and the target position for the airbag are set at the same position, if the instrument panel 10 and the steering wheel 22 are located in the target position for the driving operation, the instrument panel position and the steering wheel position remain the same.

According to the first embodiment, the following operations and effects can be obtained.

(1) The vehicle 100 includes: the instrument panel 10, which is disposed on a front side of the seat 102, and which is movable in the front-rear direction; the actuator 13, which moves the instrument panel 10 in the front-rear direction; the steering part 20, which is provided in the instrument panel 10, and which is movable relatively in the front-rear direction with respect to the instrument panel 10; the actuator 24, which moves the steering part 20 (the steering wheel 22) relatively in the front-rear direction with respect to the instrument panel 10; the controller 51 (the CPU 51A) configured to control the actuators 13 and 24; and the storage unit 51B configured to store a target instrument panel position and a target steering wheel position in association with the driver 200 beforehand (FIGS. 1A, 2A, and 3). The controller 51 determines whether the driver 200 has started the driving operation. Specifically, the controller 51 determines whether the power switch 52 has been turned on. When determining that the power switch 52 has been turned on, the controller 51 controls the actuators 13 and 24 so that the instrument panel and the steering part 20 are respectively located in the target positions for the driving operation stored in the storage unit 51B (FIG. 5). This enables the instrument panel 10 and the steering wheel 22 to move to the target positions in consideration of the physical constitutions of the driver 200 when the power switch 52 is turned on, and it becomes possible to enhance satisfaction of the driver 200 with regard to these positions.

(2) The power switch 52 is a switch to be turned on, when the driver 200 starts a driving operation. When the power switch 52 is turned on, the actuators 13 and 24 are controlled so that the instrument panel and the steering wheel respectively move to the target positions for the driving operation. This enables the instrument panel 10 and the steering wheel 22 to move to the target positions at an optimum timing for the driver 200 to start the driving operation.

(3) The vehicle 100 further includes the vehicle speed sensor 53 (FIG. 3). Upon detection that the power switch 52 is turned off or when the vehicle speed sensor 53 detects that the vehicle stops continuously for a predetermined time or more, the controller 51 controls the actuators 13 and 24 so that the instrument panel 10 is located in the retracted position where the instrument panel 10 has moved forward to the maximum and the steering wheel 22 is located in the housed position where the steering wheel 22 is housed in the instrument panel 10 (FIG. 5). Accordingly, when the driver 200 gets off the vehicle 100, the instrument panel 10 and the steering wheel 22 retract to the front side of the vehicle, making it easy for the driver to get off the vehicle.

(4) In the housed position, the steering part 20 (the steering wheel 22) is accommodated in the depressed portion 16 provided in the instrument panel 10 (FIG. 2B). This enables enlargement of the space on the front side of the seat 102 to a maximum degree, without the steering wheel 22 protruding rearward.

(5) The vehicle 100 further includes the airbag module 30, which is provided in the steering part 20, and which includes an airbag that inflates and deploys rearward, when a predetermined impact on the vehicle 100 is detected (FIG. 2A). In addition to the target positions for the driving operation, the storage unit 51B further stores the target positions for the airbag that are associated with the driver 200 beforehand and that are target positions of the instrument panel 10 and the steering wheel 22, when the airbag module 30 is activated. When the acceleration sensor 54 detects a predetermined impact that activates the airbag module 30, the controller 51 controls the actuators 13 and 24 so that the instrument panel 10 and the steering wheel 22 move to the target positions for the airbag (FIG. 5). This enables inflating and deploying the airbag at an optimum position for the driver 200.

Second Embodiment

A second embodiment of the present invention is explained with reference to FIGS. 6 to 8. The same portions as those in FIGS. 1A to 5 are denoted by the same reference numerals, and differences from the first embodiment will be mainly described below. In the second embodiment, the vehicle 100 is a vehicle having a self-driving function, that is, a self-driving vehicle. This is different from the first embodiment. In the vehicle 100 having such a driving support technology, it is necessary to optimally set the steering position and the steering wheel position in order to contribute to advancements of sustainable transportation systems.

The vehicle 100 has a self-driving system. The self-driving system includes sensors that detect external situations of the vehicle 100, including a camera, a radar, and a LiDAR (which are collectively referred to as external sensors). The self-driving system detects a location of an obstacle in the surroundings of the vehicle 100 and a distance to the obstacle by use of signals from the external sensors, generates a target path to avoid contact with the obstacle, and controls a vehicle traveling actuator so that the vehicle 100 travels along the target path toward a target location.

Figure 6:
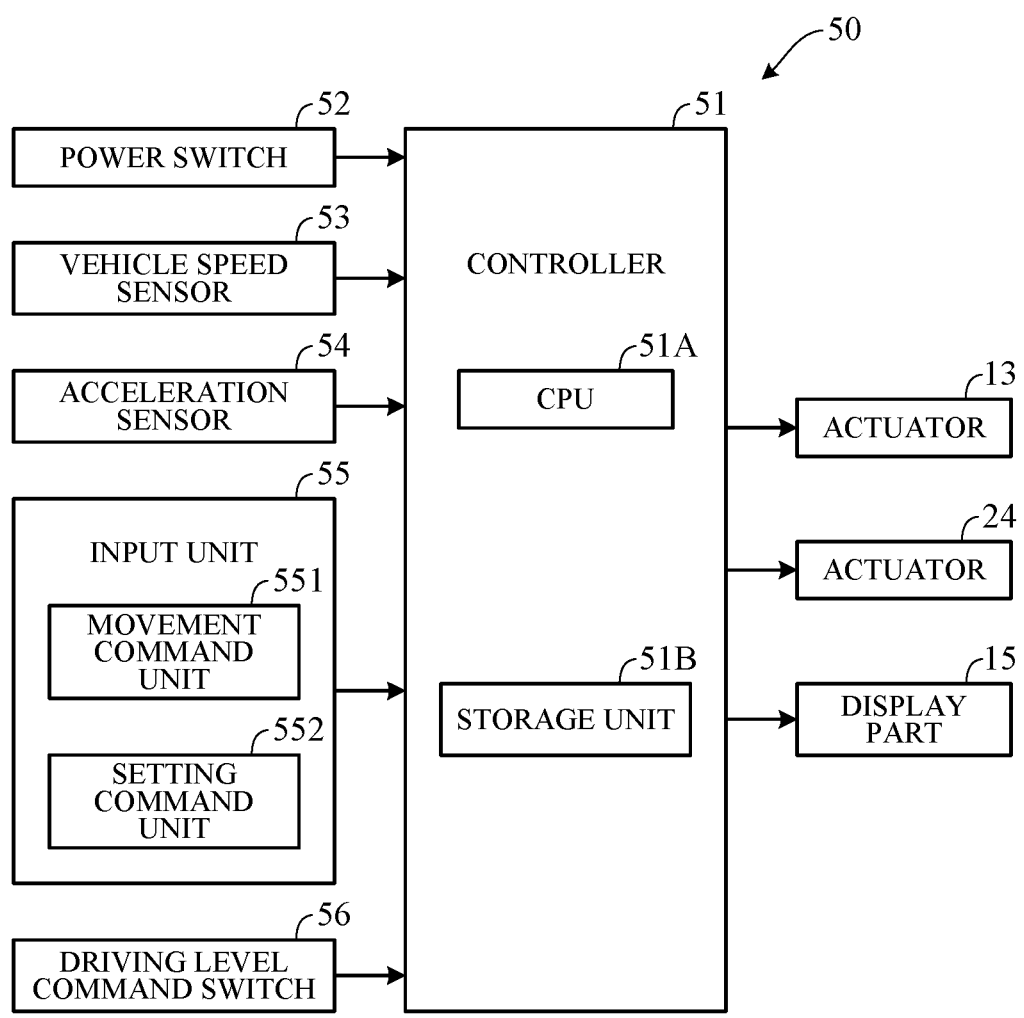
FIG. 6 is a block diagram illustrating a configuration of main components of a control device mounted on the vehicle according to a second embodiment of the present invention.

FIG. 6 is a block diagram showing a configuration of the control device 50 mounted on the vehicle 100 according to the second embodiment of the present invention. As illustrated in FIG. 6, in addition to the configuration illustrated in FIG. 3, the control device 50 further includes a driving level command switch 56 connected to the controller 51, and a display part 15.

The driving level command switch 56 is configured as, for example, a switch provided in the instrument panel 10 or the steering part 20 and manually operable by a driver, and a driving automation level is commanded in accordance with the switch operation. The driving automation level is an index of driving automation degree. SAE J3016 recommended by SAE (Society of Automotive Engineers) International, for example, classifies driving automation into Level 0 to Level 5. Level 0 indicates no driving automation. At level 0, all driving operations are performed by a human operator (driver).

At Level 1, the self-driving system performs one among acceleration, steering and braking of the Dynamic Driving Task (DDT) (driver assistance automation). At Level 1, therefore, the self-driving system operates under specified conditions to control some among the accelerator, brakes and steering wheel in accordance with surrounding circumstances, and the driver performs all of the remaining DDT. At Level 2, the self-driving system simultaneously performs multiple DDT subtasks among acceleration, steering and braking (partial driving automation). Up to Level 2, the driver is responsible for monitoring vehicle surroundings.

At Level 3, the self-driving system performs all of the DDT acceleration, steering and braking subtasks, and the driver responds only when requested by the self-driving system (conditional driving automation). At Level 3 and higher, the self-driving system monitors the surroundings and no responsibility to monitor surroundings falls on a human. At Level 4, the self-driving system performs the entire DDT under specified conditions and a user (driver) does not take over even when the self-driving system cannot continue driving (high driving automation). At Level 4 and higher, therefore, the self-driving system deals even with emergency situations. At Level 5, the self-driving system autonomously self-drives under all conditions (full driving automation).

The driving level command switch is, for example, configured as a switch manually operable by the driver to select one of Levels 0 to 5 as driving automation level. Optionally, the self-driving system can be adapted to determine whether factors like surrounding circumstances meet conditions enabling self-driving and automatically operate the driving level command switch 56 to instruct selection of one of the Levels 0 to 5 in accordance with the determination results.

The CPU 51A changes the instrument panel position and the steering wheel position in accordance with a driving automation level that has been instructed by the driving level command switch 56. Specifically, in a case where the driving automation level equal to or lower than level 2 is instructed, as illustrated in FIGS. 2A and 4, the CPU 51A respectively outputs the control signal to the actuators 13 and 24 to move the instrument panel 10 and the steering wheel 22 to the normal position and the protrusion position corresponding to the physical constitutions of the driver 200. That is, in this case, the driver 200 operates the steering wheel 22, the accelerator input unit, and the brake input unit, while the vehicle is traveling, or there is a high possibility of operating them. For this reason, the CPU 51A sets the target position for the driving operation corresponding to the driver 200 as the target positions of the instrument panel 10 and the steering wheel 22, and moves the instrument panel 10 and the steering wheel 22 to positions for the driver 200 to easily operate.

In a case where the driving automation level equal to or higher than level 4 is instructed by the driving level command switch 56, the CPU 51A outputs control signals to the actuators 13 and 24 to move the instrument panel 10 and the steering wheel 22 respectively to the retracted position and the housed position, as illustrated in FIG. 2B. That is, in this case, the driver 200 does not have to perform the driving operation. For this reason, the CPU 51A sets the initial target positions as the target positions of the instrument panel 10 and the steering wheel 22 to move the instrument panel 10 and the steering wheel 22 to foremost positions. This enables enlargement of the space around the driver 200, and enhances the comfortability.

Figure 7:
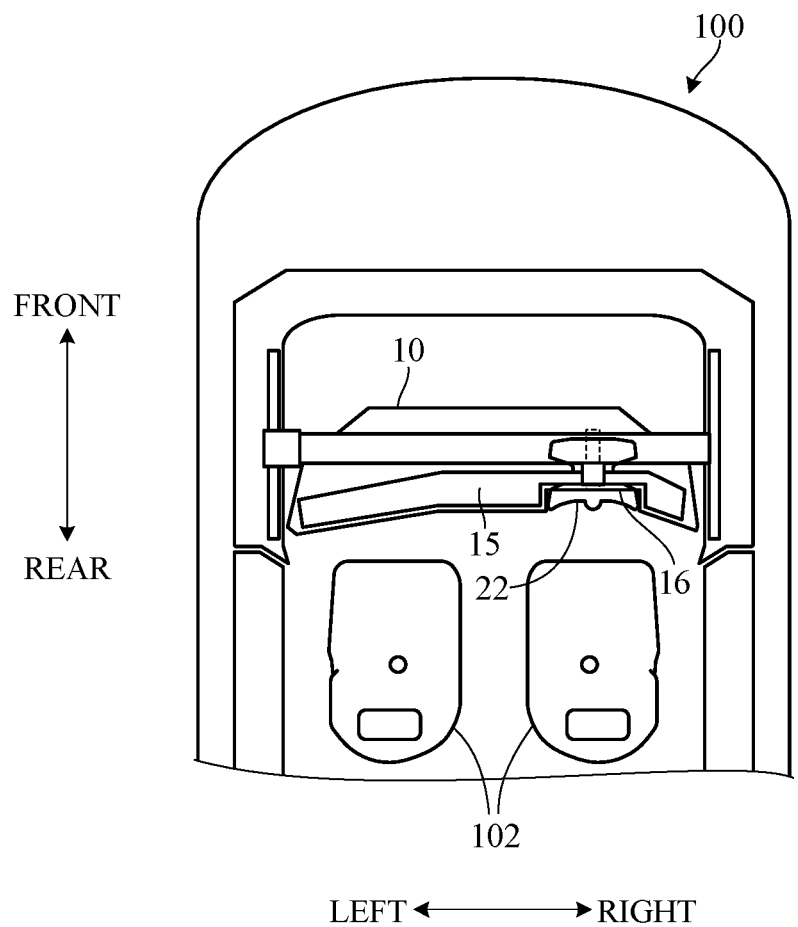
FIG. 7 is a plan view illustrating a position of the instrument panel specific to the vehicle according to the second embodiment of the present invention.

On the other hand, in a case where the driving automation level of level 3 is instructed by the driving level command switch 56, the CPU 51A outputs control signals to the actuators 13 and 24 to move the instrument panel 10 and the steering wheel 22 respectively to the normal position and the housed position, as illustrated in FIG. 7. That is, in this case, it is necessary for the driver 200 to be able to immediately perform the driving operation, when the self-driving system makes a request. Therefore, the target positions of the instrument panel 10 and the steering wheel 22 are respectively set to the target positions for driving standby that is a combination of the normal position and the housed position, and the instrument panel 10 is moved to the normal position and the steering wheel 22 is moved to the housed position. Instead of setting the instrument panel 10 to the normal position, the instrument panel 10 may be located on a front side relative to the normal position and on a rear side relative to the retracted position.

Figure 8:
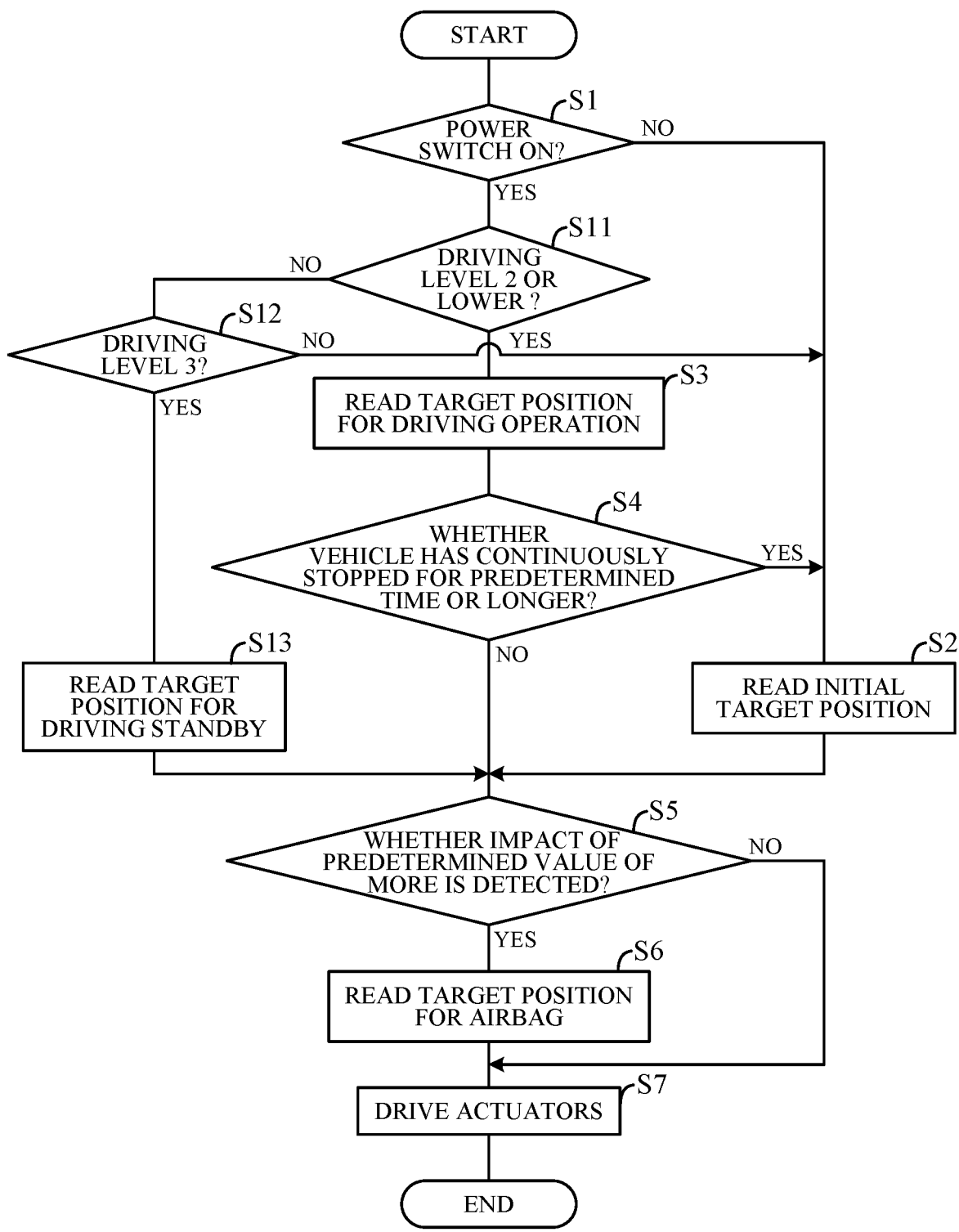
FIG. 8 is a flow chart illustrating an example of processing performed by a CPU of FIG. 6.

FIG. 8 is a flowchart illustrating an example of processing performed by the CPU 51A of FIG. 6 in accordance with a pre-stored program. In FIG. 8, if an affirmative decision is made in S1, the processing proceeds to S11, and the CPU 51A determines whether the driving automation level is equal to or lower than level 2, based on the signal from the driving level command switch 56. If an affirmative decision is made in S11, the processing proceeds to S3. Thereafter, the processing similar to that in the first embodiment (FIG. 5) is performed. On the other hand, if a negative decision is made in S11, the processing proceeds to S12, and the CPU 51A determines whether the driving automation level is level 3. If a negative decision is made in S3, that is, in a case where it is determined that the driving automation level is equal to or higher than level 4, the processing proceeds to S2. Thereafter, the processing similar to that in the first embodiment (FIG. 5) is performed. If an affirmative decision is made in S12, the processing proceeds to S13, and the CPU 51A reads the target position for the driving standby from the storage unit 51B, and then the processing proceeds to S5. Thereafter, the processing similar to that in the first embodiment (FIG. 5) is performed. The processing of S4 may be performed not only after S3 but also after S12.

In the above description, the target positions (the target positions for the driving standby and the initial target positions) are set to be different between the case where the driving automation level is level 3 and the case where the driving automation level is equal to or higher than level 4. However, identical target positions may be set. For example, in the case where the driving automation level is equal to or higher than level 4, the target positions for the driving standby may be set in a similar manner to the case where the driving automation level is level 3.

Furthermore, the CPU 51A outputs a control signal to the display part 15 to change a display mode of the display part 15 (the touch panel) in accordance with the instrument panel position and the steering wheel position. Specifically, in a case where the instrument panel position is the normal position and the steering wheel position is the protrusion position, that is, in the case where the driving automation level is equal to or lower than level 2, less information is displayed on the display part 15 than the case where the instrument panel position is the normal position and the steering wheel position is the housed position, that is, in the case where the driving automation level is level 3.

This is because in the case where the steering wheel position is the protrusion position, the driver is able to input a command by operating a switch (a steering switch) provided on the steering wheel 22 without operating the touch panel. Therefore, in the case where the driving automation level is equal to or lower than level 2, information that can be instructed by the steering switch is not displayed on the display part 15. In a case where the positions of the instrument panel 10 and the steering wheel 22 are respectively the positions illustrated in FIG. 7, the display mode is set to a touch panel mode into which a command is input from the driver by operating the touch panel. For example, in the processing subsequent to S13 in FIG. 8, the touch panel mode is set in accordance with a command from the CPU 51A. In addition, in the case where the positions of the instrument panel 10 and the steering wheel 22 are respectively the positions illustrated in FIG. 2A, the display mode is a limited touch panel mode in which commands are input from the touch panel and the steering switch. For example, in the processing subsequent to S3 in FIG. 8, the limited touch panel mode is set by a command from the CPU 51A.

On the other hand, in a case where the instrument panel position is the retracted position and the steering wheel position is the housed position, that is, in the case where the driving automation level is equal to or higher than level 4, the display part 15 is distant from the driver 200 (FIG. 2B), and thus the touch panel is not operated. In this case, unlike the case where the driving automation level is equal to or lower than level 3, the CPU controls the display part 15 to display minimum vehicle traveling information or to display information other than the vehicle traveling information. Such a display mode will be referred to as an appreciation mode. Therefore, in the case where the positions of the instrument panel 10 and the steering wheel 22 are respectively the positions illustrated in FIG. 2B, the display mode is set to the appreciation mode in accordance with a command from the CPU 51A, for example, in the processing subsequent to S2 in FIG. 8.

An operation part (such as a touch panel) connected with the controller 51 may be provided on the seat 102 so that the display content of the display part 15 in the appreciation mode can be changed by a command from the driver 200, and the display content may be changed by an operation on the operation part. The mobile terminal owned by the driver 200 and the controller 51 may be communicably connected with each other, and the display content may be changed by a command that has been transmitted from the mobile terminal. Instead of the instrument panel 10 moving to the retracted position in the appreciation mode, the instrument panel 10 may move to a position for the driver 200 to easily see the display part 15 (for example, an intermediate position between FIG. 2B and FIG. 7).

According to the second embodiment, in addition to the operations and effects of the first embodiment, the following operations and effects are further achievable.

(1) The vehicle 100 according to the second embodiment is the self-driving vehicle having the self-driving system, and further includes the driving level command switch 56, which switches between the driving automation level equal to or lower than level 2 that includes a responsibility to monitor surroundings of a driver during traveling and the driving automation level equal to or higher than level 3 that does not include the responsibility to monitor surroundings (FIG. 6). In a case of being switched to the driving automation level equal to or lower than level 2 by the driving level command switch 56, the CPU 51A controls the actuators 13 and 24 so that the instrument panel 10 and the steering wheel 22 are respectively located in the target positions for the driving operation (FIG. 2A and FIG. 4) corresponding to the physical constitutions of the driver 200 (FIG. 8). On the other hand, in a case of being switched to the driving automation level equal to or higher than level 3 by the driving level command switch 56, the actuators 13 and 24 are controlled so that the instrument panel 10 is located in the target instrument panel position corresponding to the physical constitutions of the driver 200 and the steering wheel 22 is located in the housed position, that is, the target positions for the driving standby (FIG. 7) or the initial target positions (FIG. 8). In this manner, in a case where the driver 200 does not have to operate the steering wheel 22 and the driving automation level is equal to or higher than level 3, at least the steering wheel 22 is moved to the housed position. Thus, the space on a front side of the driver 200 is enlarged, and the comfortability of the driver 200 is enhanced.

(2) While the vehicle is traveling in self-driving, the driving level command switch 56 is capable of switching the driving automation level between level 3 at which there is a possibility that the driving operation is requested from the self-driving system and equal to or higher than level 4 at which there is no possibility that the driving operation is requested from the self-driving system. In a case of being switched to the driving automation level equal to or higher than level 4 by the driving level command switch 56, the CPU 51A controls the actuator 13 so that the instrument panel 10 is located on a front side relative to the case of being switched to the driving automation level of level 3 (FIGS. 2B, 7, and 8). This further enlarges the space on the front side of the driver 200 at level 4 or higher, and the comfortability of the driver 200 is further enhanced.

(3) The instrument panel 10 includes the display part 15 including the touch panel operable by the driver (FIGS. 2A, 2B, 4, and 7). The CPU 51A further controls the display part 15 so that a display content is changed in accordance with the instrument panel position and the steering wheel position. Accordingly, it becomes possible to efficiently display information on the touch panel in consideration of easiness in the operation on the touch panel by the driver 200 (a distance to the touch panel) and the necessity of information display on the touch panel.

The above embodiment can be varied into various forms. Some variations will be described below. In the above embodiment, the display part 15 including the touch panel operable by the driver 200 is provided on the rear surface of the instrument panel but a operation unit may be configured by other than the touch panel. Therefore, the configuration of an instrument panel disposed in front of the vehicle seat is not limited to the above configuration. In the above embodiment, the left and right end portions of the movable frame 11 integral with the instrument panel 10 are slidably engaged along the left and right rails 12 extending in the front-rear direction, and the instrument panel 10 is driven in the front-rear direction by the actuator 13 such as a motor, but the configuration of a first actuator is not limited to that described above. The first actuator may be a cylinder instead of the motor.

In the above embodiment, the steering part 20 is configured by the steering wheel 22 provided at the rear end portion of the steering shaft 21, but the configuration of a steering part is not limited to the above configuration. In the above embodiment, the steering wheel 22 is configured to be movable along the steering shaft 21 or integrally with the steering shaft 21 by the actuator 24 such as a motor, but the configuration of a second actuator may be any configuration as long as the steering part is moved relative to the instrument panel. The steering part may be moved relative to the instrument panel in a direction other than the front-rear direction to be housed in the recess of the instrument panel 10.

In the above embodiment, when the power switch 52 is turned on, the CPU 51A determines that the start of the driving operation has been executed, but the configuration of a determination unit that determines whether the start of the driving operation has been executed by the driver is not limited to this. For example, a seat belt switch that is turned on when the seat belt is mounted may be provided, and when the seat belt switch is turned on, it may be determined that the driving operation is started. In the above embodiment, when the steering part 20 is located in the housed position, the steering part 20 is housed in the depressed portion 16 of the instrument panel 10, but may be housed in a position other than the depressed portion. In the above embodiment, the instrument panel 10 and the steering wheel 22 are moved to the retracted position and the housed position, respectively, when a stop of the vehicle is detected continuously for a predetermined time or longer by the vehicle speed sensor 53 (a vehicle stop detector), but this movement may not be performed until the power switch 52 is turned off.

In the above embodiment, when the power switch 52 is turned on, the instrument panel 10 and the steering wheel 22 are moved to the target instrument panel position (a first target instrument panel position) and the target steering wheel position (a first target steering position), respectively. When a predetermined impact is detected by the acceleration sensor 54, the instrument panel 10 and the steering wheel 22 are moved to the target instrument panel position (a second target instrument panel position) and the target steering wheel position (a second target steering position), respectively. Here, with respect to the positional relationship between the first target instrument panel position and the second target instrument panel position and the positional relationship between the first target steering position and the second target steering position, they may be the same position as each other, either one (for example, the first target instrument panel position) may be located forward or backward of the other (for example, the second target instrument panel position).

In the above embodiment, the driving automation level is switched in the range of levels 0 to 5 by the driving level command switch 56, but a driving level switching part may be configured to switch the driving level at the time of self-driving to a driving automation level (a first driving automation level) of level 2 or less involving a driver responsibility to monitor surroundings during traveling or a driving automation level (a second driving automation level) of level 3 or more not involving the responsibility to monitor surroundings. Alternatively, during traveling in the self-driving, the driving level switching part may be configured to be switchable between a driving automation level of level 3 (a conditional second driving automation level) at which there is a possibility that a driving operation is requested from the self-driving system and a driving automation level of level 4 or higher (a non-conditional second driving automation level) at which there is not the possibility that the driving operation is requested from the self-driving system. In the above embodiment, when the driving automation level is switched to level 3, the CPU 51A output the control signal to move the instrument panel to the normal position (a target instrument panel position), but may move forward from the normal position. In the above embodiment, when the driving automation level is switched to level 4 or higher, the CPU 51A outputs the control signal to move the instrument panel 10 to the retracted position (foremost portion), but it may be moved rearward from the retracted position.

The above embodiment can be combined as desired with one or more of the above modifications. The modifications can also be combined with one another.

According to the present invention, a driver can obtain sufficient satisfaction with a position of an instrument panel.

Above, while the present invention has been described with reference to the preferred embodiments thereof, it will be understood, by those skilled in the art, that various changes and modifications may be made thereto without departing from the scope of the appended claims.

What is claimed is:

1. A vehicle comprising:
an instrument panel disposed on a front side of a vehicle seat in a manner movable in a front-rear direction;
a first actuator configured to move the instrument panel in the front-rear direction;
a steering part provided in the instrument panel in a manner movable relatively in the front-rear direction with respect to the instrument panel;
a second actuator configured to move the steering part relatively with respect to the instrument panel;
a microprocessor configured to perform controlling the first actuator and the second actuator; and
a memory configured to previously store a target instrument panel position and a target steering position in association with a driver, wherein
the microprocessor is configured to perform
the controlling including determining whether the driver has started a driving operation, and when it is determined that the driver has started the driving operation, controlling the first actuator and the second actuator so that the instrument panel and the steering part are respectively located in the target instrument panel position and the target steering position stored in the memory,
the vehicle is a self-driving vehicle having a self-driving system,
the vehicle further comprises
a driving level switching portion configured to switch a driving level in a self-driving to a first driving automation level involving a driver responsibility to monitor surroundings during traveling or a second driving automation level not involving the driver responsibility to monitor the surroundings during traveling, and
the microprocessor is configured to perform
the controlling including controlling the first actuator and the second actuator so that when the driving level is switched to the second driving automation level by the driving level switching portion, the instrument panel is located in the target instrument panel position and the steering part is located in a housed position where the steering part is housed in the instrument panel.

2. The vehicle according to claim 1, further comprising a power switch to be turned on when the driver starts the driving operation, wherein
the microprocessor is configured to perform
the controlling including determining that the driver has started the driving operation when the power switch is turned on.

3. The vehicle according to claim 2, further comprising a vehicle stop detector configured to detect a stop state of the vehicle, wherein
the microprocessor is configured to perform
the controlling including controlling the first actuator and the second actuator so that when it is detected that the power switch is turned off or it is detected by the vehicle stop detector that the stop state continues for a predetermined time or more, the instrument panel is located in a retracted position where the instrument panel moves forward to a maximum and the steering part is located in the housed position.

4. The vehicle according to claim 1, wherein
the steering part is housed in a depressed portion provided in the instrument panel in the housed position.

5. The vehicle according to claim 1, wherein
the microprocessor is configured to perform
the controlling including controlling the first actuator and the second actuator so that when the driving level is switched to the first driving automation level by the driving level switching portion, the instrument panel is located in the target instrument panel position and the steering part is located in the target steering position.

6. The vehicle according to claim 1, wherein
the second driving automation level includes a conditional second driving automation level at which there is a possibility that the driving operation is requested from the self-driving system during traveling in the self-driving and a non-conditional second driving automation level at which there is not the possibility,
the driving level switching portion is configured to further switch the driving level in the self-driving to the conditional second driving automation level or the non-conditional second driving automation level, and
the microprocessor is configured to perform
the controlling including controlling the first actuator so that when the driving level is switched to the non-conditional second driving automation level, the instrument panel is positioned forward compared to when the driving level is switched to the conditional second driving automation level.

7. The vehicle according to claim 1, further comprising an airbag unit provided in the steering part to inflate and deploy reward rearward when a predetermined impact on the vehicle is detected, wherein
the target instrument panel position and the target steering position are respectively a first target instrument panel position and a first target steering position,
the memory is configured to further previously store a second target instrument panel position and a second target steering position associated with the driver, as the target instrument panel position and the target steering position when the airbag unit is activated, and the microprocessor is configured to perform the controlling including controlling the first actuator and the second actuator so that when the predetermined impact is detected, the instrument panel is located in the second target instrument panel position and the steering part is located in the second target steering position.

8. The vehicle according to claim 1, wherein
the instrument panel includes a display part having an operation portion operable by the driver, and
the microprocessor is configured to perform
the controlling including controlling the display part so as to change a display content in accordance with a position of the instrument panel and a position of the steering part.

9. The vehicle according to claim 1, wherein
the vehicle seat is provided so as to be immovable in the front-rear direction.

10. The vehicle according to claim 1, further comprising
a first operation portion configured to instruct an acceleration or deceleration of the vehicle in accordance with an operation by the driver; and
a second operation portion configured to instruct a braking of the vehicle in accordance with an operation by the driver, wherein
the first operation portion and the second operation portion are provided in a vicinity of the steering part.

11. The vehicle according to claim 1, further comprising
a support part configured to support the instrument panel in a manner movable in the front-rear direction, wherein
the support part includes
a frame member provided in the instrument panel and extended in a left-right direction, and
rail members extended in the front-rear direction on a left side wall and a right side wall of the vehicle so that ends in the left-right direction of the frame member engage therewith.

12. A vehicle comprising:
an instrument panel disposed on a front side of a vehicle seat in a manner movable in a front-rear direction;
a first actuator configured to move the instrument panel in the front-rear direction;
a steering part provided in the instrument panel in a manner movable relatively in the front-rear direction with respect to the instrument panel;
a second actuator configured to move the steering part relatively with respect to the instrument panel;
a microprocessor configured to perform controlling the first actuator and the second actuator;
a memory configured to previously store a target instrument panel position and a target steering position in association with a driver; and
a vehicle stop detector configured to detect a stop state of the vehicle,
wherein
the microprocessor is configured to perform
the controlling including determining whether the driver has started a driving operation, and when it is determined that the driver has started the driving operation, controlling the first actuator and the second actuator so that the instrument panel and the steering part are respectively located in the target instrument panel position and the target steering position stored in the memory, and the controlling further including controlling the first actuator and the second actuator so that when it is detected by the vehicle stop detector that the stop state continues for a predetermined time or more, the instrument panel is located in a retracted position where the instrument panel moves forward to a maximum and the steering part is located in a housed position where the steering part is housed in the instrument panel.

13. The vehicle according to claim 12, further comprising
a power switch to be turned on when the driver starts the driving operation, wherein
the microprocessor is configured to perform
the controlling including determining that the driver has started the driving operation when the power switch is turned on.

14. The vehicle according to claim 12, wherein
the steering part is housed in a depressed portion provided in the instrument panel in the housed position.

15. The vehicle according to claim 12, wherein
the vehicle is a self-driving vehicle having a self-driving system,
the vehicle further comprises
a driving level switching portion configured to switch a driving level in a self-driving to a first driving automation level involving a driver responsibility to monitor surroundings during traveling or a second driving automation level not involving the driver responsibility to monitor the surroundings during traveling, and
the microprocessor is configured to perform
the controlling including controlling the first actuator and the second actuator so that when the driving level is switched to the first driving automation level by the driving level switching portion, the instrument panel is located in the target instrument panel position and the steering part is located in the target steering position, while when the driving level is switched to the second driving automation level by the driving level switching portion, the instrument panel is located in the target instrument panel position and the steering part is located in the housed position.

16. The vehicle according to claim 15, wherein
the second driving automation level includes a conditional second driving automation level at which there is a possibility that the driving operation is requested from the self-driving system during traveling in the self-driving and a non-conditional second driving automation level at which there is not the possibility,
the driving level switching portion is configured to further switch the driving level in the self-driving to the conditional second driving automation level or the non-conditional second driving automation level, and
the microprocessor is configured to perform
the controlling including controlling the first actuator so that when the driving level is switched to the non-conditional second driving automation level, the instrument panel is positioned forward compared to when the driving level is switched to the conditional second driving automation level.

17. The vehicle according to claim 12, further comprising
an airbag unit provided in the steering part to inflate and deploy rearward when a predetermined impact on the vehicle is detected, wherein
the target instrument panel position and the target steering position are respectively a first target instrument panel position and a first target steering position,
the memory is configured to further previously store a second target instrument panel position and a second target steering position associated with the driver, as the target instrument panel position and the target steering position when the airbag unit is activated, and the microprocessor is configured to perform the controlling including controlling the first actuator and the second actuator so that when the predetermined impact is detected, the instrument panel is located in the second target instrument panel position and the steering part is located in the second target steering position.

18. The vehicle according to claim 12, wherein the instrument panel includes a display part having an operation portion operable by the driver, and the microprocessor is configured to perform the controlling including controlling the display part so as to change a display content in accordance with a position of the instrument panel and a position of the steering part.

19. The vehicle according to claim 12, wherein the vehicle seat is provided so as to be immovable in the front-rear direction.

20. A vehicle comprising:

an instrument panel disposed on a front side of a vehicle seat in a manner movable in a front-rear direction;

a first actuator configured to move the instrument panel in the front-rear direction;

a steering part provided in the instrument panel in a manner movable relatively in the front-rear direction with respect to the instrument panel;

a second actuator configured to move the steering part relatively with respect to the instrument panel;

a microprocessor configured to perform controlling the first actuator and the second actuator; and a memory configured to previously store a target instrument panel position and a target steering position in association with a driver, wherein the microprocessor is configured to perform the controlling including determining whether the driver has started a driving operation, and when it is determined that the driver has started the driving operation, controlling the first actuator and the second actuator so that the instrument panel and the steering part are respectively located in the target instrument panel position and the target steering position stored in the memory, the vehicle is a self-driving vehicle having a self-driving system, the vehicle further comprises a driving level switching portion configured to switch a driving level in a self-driving to a first driving automation level involving a driver responsibility to monitor surroundings during traveling, and the microprocessor is configured to perform the controlling including controlling the first actuator and the second actuator so that when the driving level is switched to the first driving automation level by the driving level switching portion, the instrument panel is located in the target instrument panel position and the steering part is located in the target steering position.

* * * * *